United States Patent [19]
Richmond

[11] Patent Number: 5,476,993
[45] Date of Patent: Dec. 19, 1995

[54] PRE-TREATMENT OF HYDROCARBONS FOR PREVENTING SPILLS

[75] Inventor: Therezia L. Richmond, Buffalo, N.Y.

[73] Assignee: 1002599 Ontario Limited, Brantford, Canada

[21] Appl. No.: 145,735

[22] Filed: Nov. 5, 1993

[51] Int. Cl.$^6$ .............................. C09K 3/32; B09B 1/00
[52] U.S. Cl. ..................... 588/252; 210/751; 588/249
[58] Field of Search ............................ 588/252; 62/46.1; 210/757, 729, 693; 126/343.5

[56] References Cited

U.S. PATENT DOCUMENTS

| | | |
|---|---|---|
| 1,591,735 | 7/1926 | Beattie . |
| 2,881,127 | 4/1959 | Hetzel . |
| 3,607,741 | 9/1971 | Sohnius . |
| 3,620,696 | 11/1971 | Hollyday et al. . |
| 3,756,948 | 9/1973 | Weinberg ............................. 210/693 X |
| 4,460,292 | 7/1984 | Durham et al. ......................... 588/252 |
| 4,470,402 | 9/1984 | Tanaka ................................. 126/343.5 |
| 4,518,507 | 5/1985 | Conner .................................... 588/252 |
| 4,687,373 | 8/1987 | Falk et al. ........................... 210/757 X |
| 5,076,938 | 12/1991 | Noonun et al. ...................... 210/751 X |

Primary Examiner—Dennis L. Taylor
Assistant Examiner—Frederick L. Lagman

Attorney, Agent, or Firm—Hill & Schumacher; Lynn C. Schumacher

[57] ABSTRACT

There is provided a process for reversibly solidifying hydrocarbons for transportation or storage to prevent spillage of the hydrocarbon. The process involves mixing the hydrocarbons with a sufficient quantity of a hydrocarbon wax, such as paraffin, heated to the liquid state, and cooling the resulting mixture until it solidifies into a firm, united mass. The minimum amount of hydrocarbon wax required to solidify the oil will depend on the type of crude oil, the type of wax being used and the temperature that the solidified mass is being maintained at during shipping. In the case of crude oil shipment by ocean tanker the crude may be pre-treated with the hydrocarbon wax in the storage compartments and the mixture transported in solid form. The solidified, united mixture effectively prevents spillage of the crude in the event of the hull being ruptured and is not displaced by sea water. The buoyant solidified mixture prevents the ship from sinking in the event of a hole being formed in the hull of the ship. Waste hydrocarbons such as contaminated PCBs are solidified using the hydrocarbon wax at much higher levels of the wax to ensure complete encapsulation of the oil. In the case of transportation of crude oil, the wax may be recovered from the crude oil by heating the mixture to liquify it and the components separated by fractional distillation.

17 Claims, 2 Drawing Sheets

PRE-TREATMENT OF HYDROCARBONS FOR PREVENTING SPILLS

FIELD OF THE INVENTION

The present invention relates to methods of reversibly solidifying hydrocarbons for transportation or storage to prevent spillage of the hydrocarbon.

BACKGROUND OF THE INVENTION

It is well known that the transportation and storage of hydrocarbons can be a hazardous affair. Crude oil is often transported via tanker vessel or tanker truck and, on occasion, vehicles carrying oil have met some calamity which resulted in the spillage of the cargo oil. It is estimated that between 30 to 40 oil tankers a year accidently release significant amounts of crude oil into the environment. At sea, the spilled oil tends to form floating oil slicks which kill fish and fowl alike. When on land, the spilled oil has a tendency to seep into the soil and contaminate ground water. In either case, the liquid oil is difficult and expensive to remove from the site of the accident.

Various methods, both physical and chemical, have been used to contain spills and to facilitate oil removal from the surface of water. A physical containment method commonly used is to encircle an oil slick with a floating boom and then scoop up the oil. Drawbacks to this method are that oil slicks tend to spread rapidly so that the slicks must be scooped up in sections and this requires considerable manpower and equipment. Obvious difficulties encountered due to high winds and rough seas will be apparent to those skilled in the art. This method is also impracticable for spills occurring far from shore.

Various chemical schemes have been proposed to clean up large surface area oil spills have been proposed. Sohnius (U.S. Pat. No. 3,607,741) discloses recovery of oil from water using cellulosic material pre-treated to render it hydrophobic to provide it with an affinity for oil. In one embodiment the cellulosic material is contained in a mesh netting to be placed on the surface of the oil. In another embodiment the cellulosic material is contained on the surface of a cylinder which rolls under wind power across an oil slick confined by a boom and entrains oil in this way. Disadvantages of this method are the need for large numbers of booms and cylinders for cleaning up large slicks. The recovery of oil from the cellulosic material would be both time consuming and expensive.

Alquist (U.S. Pat. No. 3,785,972) discloses cleaning up oil slicks by spraying a wax onto the surface of the oil slick in order to increase the liquefaction temperature of the oil above the temperature of the water thereby forming a solid mass which can be scooped up. Wax/hydrocarbon mixtures are also sprayed onto the oil slick and then ignited to burn off the lighter hydrocarbons in the crude thereby forming a hardened, asphalt-like material which is then scooped up. Bartha (U.S. Pat. No. 5,112,495) discloses spraying molten hydrocarbon wax onto the surface of an oil slick whereupon cooling the oil/wax forms a solid mass which may then be physically scooped up.

Drawbacks to these various schemes are that the application of the containment agent to the spilled oil can be costly and time consuming, and spills often occur in remote locations difficult to reach in a short time. Large amounts of wax must be transported to the spill site, heated to the liquid form and then sprayed over the entire surface of the oil slick thus requiring specialized ships and equipment. Further, to transport the large volume of solid mixture from the spill site will require large tanker ships specially adapted with the handling and loading facilities needed to scoop up and store the solid mass.

In order to minimize the chance of an oil spill, emphasis has been placed in the building of safer and stronger transportation vessels. The development of the double hulled oil tanker is an example of one such vessel. These vessels, while decreasing the chance of an oil spill by decreasing the likelihood that the compartment or container holding the oil will be ruptured, tend to be very expensive. Furthermore, no vessel is completely safe from disaster and it is possible that a sufficiently violent calamity may result in the rupture of even the strongest vessel.

The economic costs associated with bulk shipping of crude oil has increased steadily with the higher frequency of marine disasters in recent years. The insurance costs alone associated with underwriting oceanic transport of crude oil are in the tens of millions of dollars at least. It is therefore desirable to provide a method of pre-treating hydrocarbons prior to shipping which will significantly reduce the chances of oils slicks forming in the event of a mishap.

In a related matter, the storage of waste oil and hazardous hydrocarbon compounds such as PCBs (polychlorinated biphenyls), is also problematic. Usually the hydrocarbon is placed in a steel drum or barrel and then stored in a waste storage facility or buried underground. The drums used to store the hydrocarbon sometimes develop defects as a result of corrosion or as a result of an impact. These defects may result in the release of the hazardous compound causing soil and ground water contamination. The leaked hydrocarbon is difficult to clean up, often requiring the soil to be dug up and removed. Efforts have been made to strengthen the storage drums in order to lessen the probability of a leak. These superior drums tend to be expensive.

Another approach in the storage of waste oil and hazardous hydrocarbon compounds is to render the material solid. In the solid state, the consequences of a leak are less serious. The spilled hydrocarbon is easier to collect if it is in the solid state, and the solidified hydrocarbon is less likely to leach into the soil or contaminate the ground water. To solidify the hydrocarbon, a solidifying agent is added in sufficient concentration to render the mixture a solid or semi-solid mass. The solidifying agents normally used tend to be expensive, and the solidifying process is often difficult or expensive to reverse. Weitzen (U.S. Pat. No. 4,341,078) discloses the solidification of PCBs by the addition of a slurry of cryogenically comminuted polymer particles suspended in a cryogenic liquid such as liquid nitrogen. It can be appreciated that the solidifying agent used in Weitzen is expensive and requires specialized equipment to handle. The solid resulting from the Weitzen method is difficult to liquify, requiring ionizing radiation or conditions of high shear. Derby (U.S. Pat. No. 3,881,295) discloses the solidification of PCBs by the addition of swellable polymer particles. The polymer particles imbibe the PCBs and swell to form a thick gel. Derby does not disclose a method of reversing the solidification of the PCB mixture. The reversibility of the solidification step is desirable to ease the disposal of the hazardous material by incineration.

SUMMARY OF THE INVENTION

The present invention provides a method of reversibly solidifying hydrocarbons for transportation or storage. The method comprises the steps of mixing the hydrocarbon with a solidifying agent in a container and forming a mixture with the solidifying agent being selected to substantially solidify the mixture when the temperature of the solution drops below a predetermined solidification temperature range whereupon the solidified mixture forms a solidified mass. The solidified mixture liquifies upon heating to a temperature above the solidification temperature range.

In another aspect of the invention there is provided a method of encapsulating a hydrocarbon liquid for storage. The method comprises the steps of mixing the hydrocarbon with a solidifying agent and forming a mixture with the solidifying agent being selected to solidify the mixture when the temperature of the solution drops below a predetermined solidification temperature range upon which the mixture forms a substantially solid mass.

BRIEF DESCRIPTION OF THE DRAWINGS

The process of the present invention will now be described, by example only, reference being had to the drawings, in which.

DETAILED DESCRIPTION OF THE INVENTION

A) Pre-treatment of Hydrocarbons For Shipping

Figure 1:
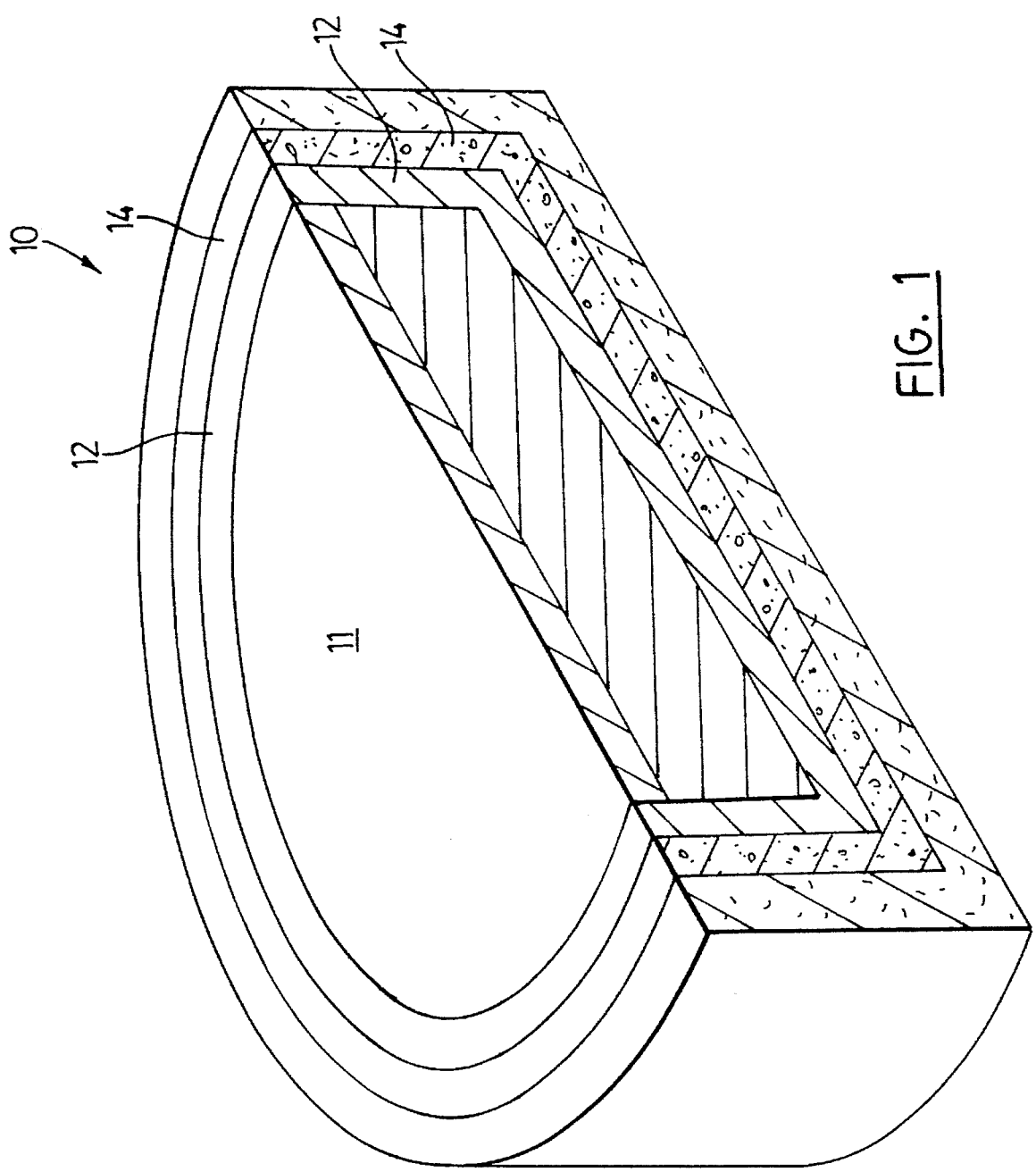
FIG. 1 is a perspective view of an encapsulated solid mixture of hydrocarbon/hydrocarbon wax in accordance with the present invention.

In accordance with the present invention, to reversibly solidify hydrocarbons such as crude oil for transportation the oil is first mixed with a solidifying agent. The solidifying agent is preferably a hydrocarbon wax. The wax is melted and heated to a temperature above the solidification temperature for the mixture and mixed with the oil. Some agitation of the oil and wax may be necessary to achieve a homogeneous mixture. The mixing may occur in the transportation vessel itself, or prior to the oil entering the vessel, in which case the solution should be held at a temperature above the solidification temperature.

In this specification, the word mixture is used in the broadest sense to mean a substance containing two or more ingredients (Webster's New World Dictionary, second college edition), namely the hydrocarbon being solidified and the hydrocarbon wax used as the solidifying agent. The nature of the resulting mixture between the hydrocarbon and wax is unclear since several types of mixture are possible including a homogeneous solution in which all the wax is dissolved, a saturated solution containing precipitated wax, an extended gel, a colloidal suspension or combinations thereof. Therefore it will be understood that the word mixture is meant to cover all possibilities. Similarly, the word solidify is defined as "to become solid, firm, hard or united" and solidification is used to describe the firm, united mixture formed by adding the solidifying agent to the hydrocarbon.

After the mixture of oil and solidifying agent are placed in the vessel, the mixture is cooled to a temperature below the solidification temperature of the mixture. This may not require any elaborate cooling mechanisms as the solidification temperature may be close to ambient depending on the choice of solidifying agent. If the vessel is sea faring, preferably the wax is chosen so the temperature of the water surrounding the vessel is sufficient to cool the mixture to the point where it solidifies. The solidified oil/wax mixture may then be safely transported.

The type of wax used may effect the required wax concentration necessary to achieve the desired solidification temperature range. On the assumption that the hydrocarbon wax will exhibit some degree of solubility in the oil, the oil acts as a solute to lower the melting point of the wax so that it is expected that the higher the melting point of the wax, the lower the wax concentration required to reach a specific solidification temperature range in cases where solution formation is an important mechanism.

In one embodiment of the invention the hydrocarbon wax is paraffin wax which is both inexpensive and for all practical purposes biologically and chemically inert. The concentration of wax used in the solution generally varies between 1.0% to 15% by volume. The concentration of wax is adjusted depending on the type of crude oil being shipped and the desired solidification temperature of the solution. Viscous crude oil generally requires a lower concentration of paraffin wax as compared to light crude oil. If a higher solidification temperature is required, the concentration of the paraffin is increased. Beyond 15% paraffin by volume there is not a large increase in the solidification temperature, regardless of the grade of crude oil used. On a gallon basis, the inventor has found that effective solidification of the crude oil is obtained when the concentration of liquefied paraffin wax in the mixture is between about 2 ounces to point range of greater than 50° C.

Depending on the type of crude oil and the quality of the paraffin wax, the solution may not have a specific solidification temperature. The solidification temperature may be a range within which the mixture undergoes the liquid to solid phase transition. Above the range, all of the mixture would be in the liquid phase, while below the range, all of the mixture would be in the solid phase. During the mixing step, the temperatures of both the paraffin wax and the oil should be above the solidification temperature range for the mixture. Paraffin wax has a melting point of approximately 55° C. which will be above the solidification temperature of the mixture; therefore, it is possible to mix the paraffin with the oil if the oil is only slightly above the solidification temperature. If the oil temperature is too low, then the paraffin may rapidly solidify upon contacting the oil and insufficient mixing of oil and paraffin occurs. Insufficient mixing of oil and wax may result in pockets of liquid oil in the transportation vessel.

The rate of solidification depends on the rate of cooling and the initial temperature of the mixture. It will be appreciated that large volumes of the mixture would require longer cooling periods in order to fully solidify. It is anticipated that in the example of a sea faring tanker vessel, the temperature of the surrounding sea water would be sufficiently low to cool the mixture into a solid mass within a short period of time. Even if the cargo is not fully solidified, it is expected that the mixture will form a solidified "skin" where the mixture contacts the cold walls of the hull of the vessel, the skin surrounding an inner mass of liquid mixture. The solidified skin should hinder the flow of mixture out of the cargo hold in the event of a rupture. Any liquid which does leak through such a rupture will be in direct contact with sea water. In most latitudes travelled by ocean going oil tankers, the sea water would be sufficiently cold to solidify the escaped mixture.

The solidified mixture also has the benefit of rendering the tanker vessel safer to its crew. The firm, buoyant solidified mixture in the cargo hold of the ship will not be displaced by water in the event of a rupture so that the vessel remains buoyant even if its hull has been punctured below the water-line.

The mixture may be heated in order to facilitate its removal from the cargo hold of a vessel. Once liquified, the mixture is pumped from the ship and may be placed in a holding tank or piped directly to the refinery. The paraffin wax may be recovered from the hydrocarbon using recovery techniques known to those skilled in the art such as fractional distillation. The paraffin wax recovered from the mixture may be reused again and again as the solidifying agent for shipping oil. The recycling of paraffin may decrease the overall cost of this method of oil transportation by decreasing the need to purchase additional paraffin.

The volume of oil shipped per tanker will be decreased depending on the concentration of the wax in the solution. If the solution comprises 4% wax by volume, then the tanker will be transporting 4% less oil per trip as a result. Allowances must be made for the volume of liquified wax which is added to the tanker. If the liquified wax is being pumped into the tanker along with the oil, then the rate the oil is pumped into the tanker may be adjusted to compensate. The higher the concentration of paraffin, the more rapidly the solidification process proceeds with upon addition of the paraffin and the harder the resulting buoyant mass.

It will be appreciated by those skilled in the art that other waxes may be used in addition to paraffin. For example, suitable solidifying agents include the broader low temperature melting paraffinic waxes, carnauba wax; saturated fatty acids such as for example palmitic acid (m.p. 63°C.) and stearic acid (m.p. 70°C.); and ozocerite which is a naturally occurring mineral wax comprising a mixture of solid hydrocarbons. The preferred concentration of the particular wax is determined in part by the solubility of the wax in the particular grade of crude, the melting point of the wax and the temperature at which the mixture is being maintained at during shipment.

In addition to crude oil, it will be immediately clear to those skilled in the art that other hydrocarbon liquids may be solidified in the same way using the hydrocarbon waxes as disclosed herein.

In an other embodiment of the invention, the solidifying agent is not mixed with the oil until just prior to a calamity. The solidifying agent is kept in a liquid state in separate compartments and when the ship carrying the oil appears to be in danger of a rupture, the solidifying agent is rapidly mixed with the oil to form a mixture. Upon exposure to the cold ocean water, rapid solidification occurs to produce a buoyant mass thereby preventing excessive loss of crude oil. By adding the solidifier to the crude oil only when a calamity is imminent, the costs associated with recovering the solidifier in cases where a calamity does not occur is reduced.

B) Treatment of Contaminated Oils

To encapsulate waste oil or hazardous hydrocarbons such as PCBs for storage, the hydrocarbon is first mixed with a melted hydrocarbon wax to form a mixture. The temperature of the wax and hydrocarbon is maintained at a temperature above the solidification temperature. While the mixture is in a containment vessel such as a drum it is then cooled to a temperature below the solidification temperature. The resulting solidified solid may be stored for an indefinite period of time.

Paraffin wax or other waxes having similar melting points may be used. The concentration of wax in the mixture is dependant on several variables including the type of hydrocarbon to be encapsulated. The higher the percent by weight wax present, the higher the solidification temperature of the solidified mixture.

The temperature of the hydrocarbon is maintained during the mixing stage at a temperature above the solidification temperature range. The concentrated solution may then be added to the hydrocarbon. Agitation may be required to fully mix the concentrated wax solution with the hydrocarbon.

The solidification temperature of the mixture is dependant on the type of hydrocarbon being encapsulated, the quality and purity of the paraffin wax, and the concentration of the paraffin wax. As in the case with oil encapsulation, the solidification temperature may not be specific and may range over a few degrees centigrade. The type of wax and the purity of the hydrocarbon all contribute to the magnitude of this range.

As with the case of crude oil solidification, the rate of solidification is dependant on the initial temperature of the mixture and the rate of cooling. The solidification rate is not critical in this case because the mixture shall generally remain in the storage container for some time before the container is shipped.

In the event that the containment vessel is ruptured, the escape of hazardous hydrocarbon is curtailed by the solidity of the mixture. If the containers are buried or resting on the ground, the likelihood of the hazardous hydrocarbon leaching into the soil is likewise lessened.

In one non-limiting example to solidify waste PCBs, paraffin wax is heated to between 130° to 140° F. and the PCBs held at room temperature or higher. Two cups (16 oz.) of liquid natural paraffin wax are added to a container containing 14 cups (112 oz.) of PCB waste oil and the resulting homogenous mixture is solidified to form about a gallon of solidified PCB.

In a scaled up example, 6.5 to about 7 gallons of liquified paraffin wax between 130° to 140° F. is added to a standard drum containing about 48 gallons of waste PCB oil and the resulting mixture is stirred to form a homogeneous mass which upon cooling solidifies. Up to 50% by volume of paraffin may be used to ensure complete entrainment of the waste oil depending on the application.

Figure 2B:
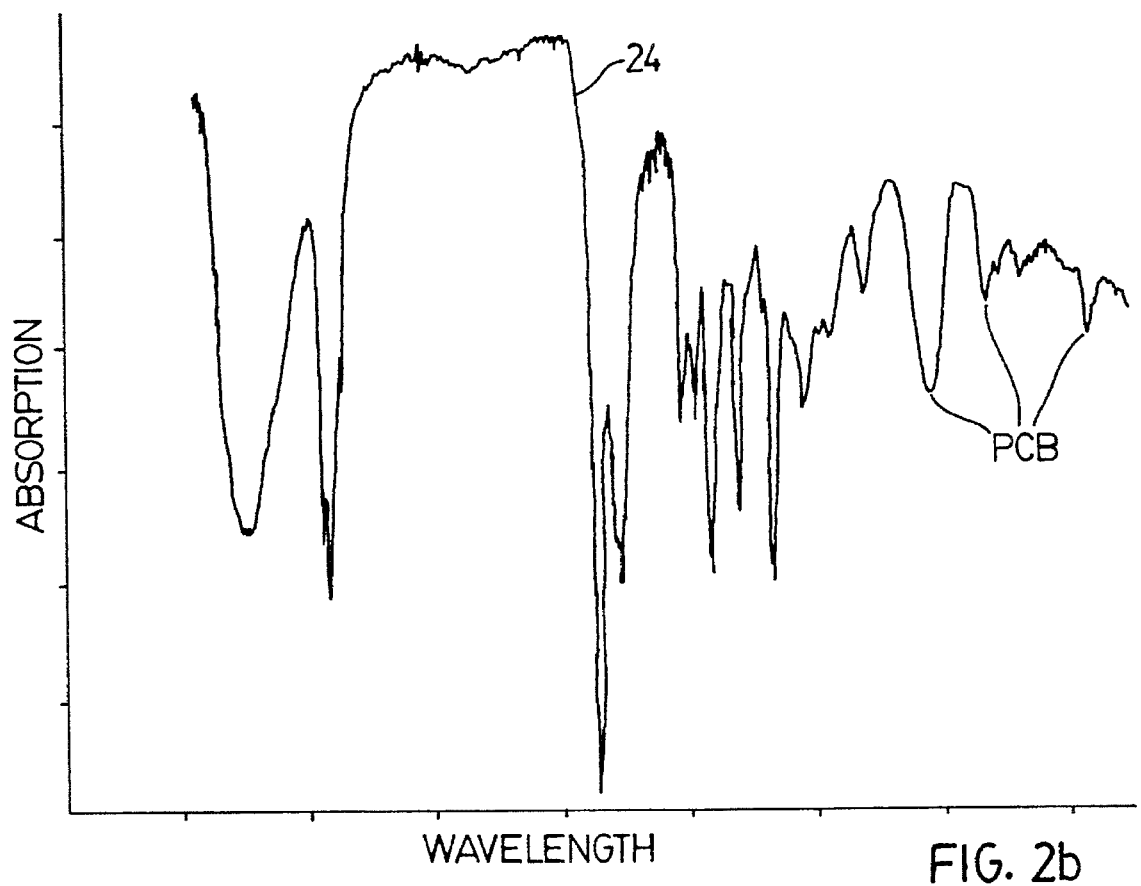
FIG. 2(b) is an infrared analysis of PCB contaminated oils.
Figure 2A:
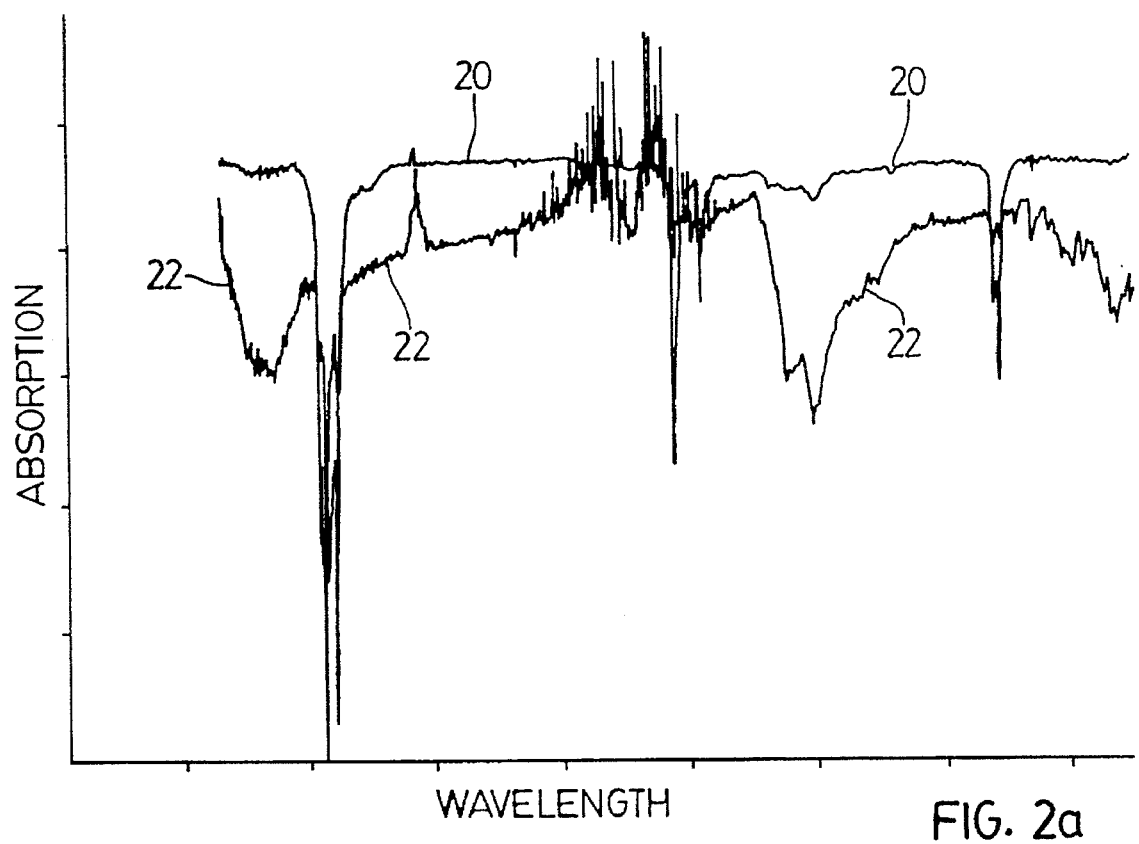
FIG. 2(a) shows the results of an infrared analysis of an encapsulated mixture such as that shown in FIG. 1.

Referring to FIG. 1, there is shown generally at 10 an encapsulated mixture 11 of PCB and hydrocarbon wax according to the process disclosed herein. A neutralizer layer 12 comprising paraffin encapsulates the solidified mixture 10 and an outer sealer layer 14 comprising portland cement forms an rigid, supporting outer protective layer. The infrared analysis shown in FIG. 2(a) is for structure 10 of FIG. 1, which was initially encapsulated in a container; the structure removed and sectioned and the analysis carried in each of the layers 12 and 14. Wavelength scan 20 was taken of an interior section of neutralizer layer 12 and scan 22 was taken of an interior section of sealer layer 14. Superimposed on FIG. 2(a) is FIG. 2(b) which includes a scan 24 of a PCB contaminated oil sample with the characteristic PCB peaks marked. Comparison of FIG. 2(a) with FIG. 2(b) shows that there were no PCBs detectable using this technique within layers 12 and 14. This illustrates the efficacy of the solidification process for sealing waste PCBs using paraffin as disclosed herein.

In the event that the hazardous hydrocarbon is to be disposed of permanently via incineration or the like, the solution may be liquified by simply heating it to a temperature above the solidification temperature. The liquified solution may then be introduced into an incinerator as is. Alternatively, if it is desired to relocate the oil into other containers the mixture is liquified and transferred.

While the method of reversibly solidifying hydrocarbons prior to shipping has been described with specific reference to paraffin, it will be appreciated by those skilled in the art that numerous variations of the process may be readily made without departing from the scope of the invention disclosed herein. For example, as mentioned other hydrocarbon based waxes may be used to the same effect as the paraffin wax and the optimum % by volume of the wax to the hydrocarbon will be determined by the type of hydrocarbon being solidified, to the type of solidifying material being used and those skilled in the art will be able to readily determine the optimum values in a routine way.

Therefore what is claimed is:

1. A method of reversibly solidifying hydrocarbons for transportation or storage, the method comprising the steps of:

mixing the hydrocarbon with liquefied hydrocarbon wax in a contained volume to form a mixture while maintaining the mixture above a solidification temperature range in which the mixture will solidify, the liquefied hydrocarbon wax being present in an amount effective to substantially solidify the mixture when the temperature of the mixture drops below the solidification temperature range to thereby substantially solidify the mixture forming a hardened mass, the solidified mixture liquefying upon heating to a temperature above the solidification temperature range.

2. A method of reversibly solidifying hydrocarbons for transportation according to claim 1 wherein the hydrocarbon is crude oil and the temperature of the crude oil is maintained above the solidification temperature range of the mixture while the hydrocarbon wax is being added.

3. A method of reversibly solidifying crude oil for transportation according to claim 2 wherein the hydrocarbon wax has a melting point range of greater than about 50° C.

4. A method of reversibly solidifying hydrocarbons for transportation according to claim 3 wherein the hydrocarbon wax is paraffin wax.

5. A method of reversibly solidifying hydrocarbons for transportation according to claim 1 wherein the hydrocarbon is crude oil and the hydrocarbon wax is selected from the group consisting of paraffinic waxes, carnauba wax, palmitic acid, stearic acid and ozocerite.

6. A method of reversibly solidifying hydrocarbons for transportation according to claim 4 wherein the paraffin wax is recovered from the mixture by heating the solidified mixture to a temperature above the solidification temperature and separating the paraffin wax therefrom.

7. A method of reversibly solidifying hydrocarbons for transportation according to claim 4 wherein the mixture is removed from the container by heating the solidified mixture to a liquid state and then pumping the liquid mixture from the container.

8. A method of reversibly solidifying hydrocarbons for transportation according to claim 4 wherein the concentration of the paraffin wax in the mixture is between about 2 to about 8 oz. per gallon of crude oil.

9. A method of reversibly solidifying hydrocarbons for transportation according to claim 4 wherein the concentration of paraffin wax in the mixture is between about 1% to about 15% by volume.

10. A method of reversibly solidifying hydrocarbons for transportation according to claim 5 wherein the container is the cargo hold of a tanker.

11. A method of reversibly solidifying hydrocarbons for transportation according to claim 1 further comprising the step of recovering the solidifying agent from the hydrocarbon after the mixture has been removed from the container.

12. A method of reversibly solidifying hydrocarbons for transportation according to claim 6 wherein the paraffin wax is recovered from the crude oil by fractional distillation of the mixture.

13. A method of encapsulating a hydrocarbon liquid for storage comprising the steps of mixing the hydrocarbon liquid with liquefied paraffin wax and forming a mixture, the paraffin wax being effective to solidify the mixture when the temperature of the mixture drops below a solidification temperature range, the solidified mixture forming a substantially solidified mass.

14. A method of encapsulating a hydrocarbon liquid according to claim 13 wherein the hydrocarbon liquid is a solution of polychlorinated biphenyls and the concentration of paraffin wax is about 50% by volume.

15. In a method of solidifying oil for transportation in a vessel, comprising the steps of:

a) mixing oil with a liquefied hydrocarbon wax in a contained volume to form a mixture while maintaining the mixture at a temperature above a solidification temperature range in which the mixture will solidify;

b) reducing the temperature of the mixture below the solidification temperature range to thereby form a substantially solidified mass;

c) transporting the solidified mass in the vessel to a destination; and d) recovering the hydrocarbon wax from the oil.

16. The method of reversibly solidifying oil according to claim 15 wherein the liquefied hydrocarbon wax is paraffin wax.

17. The method of reversibly solidifying oil according to claim 16 wherein the concentration of paraffin wax in the mixture is between about 1% to about 15% by volume.

* * * * *